Oct. 23, 1934.  R. L. WATSON  1,977,658
CHUCK
Filed April 17, 1933
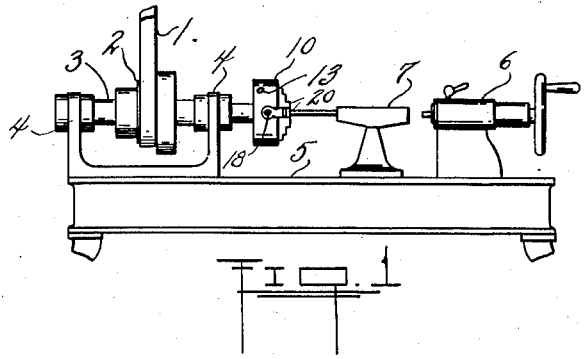
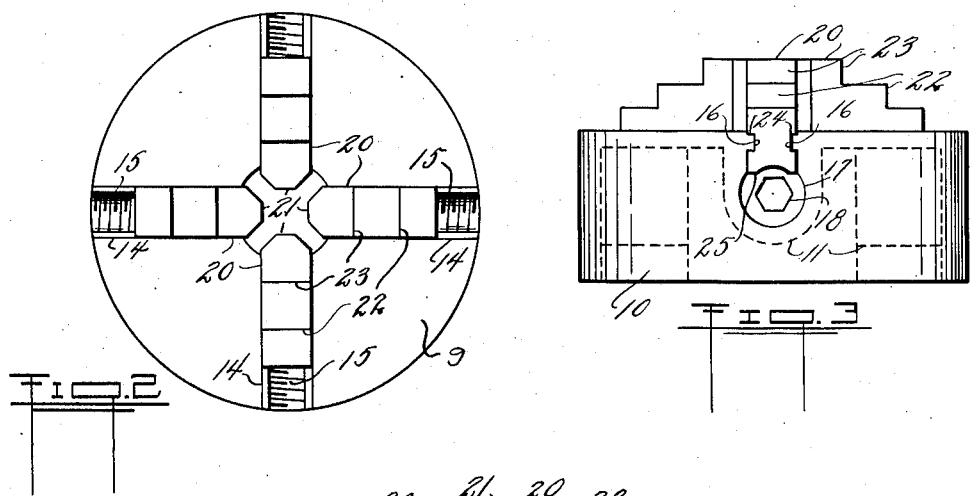
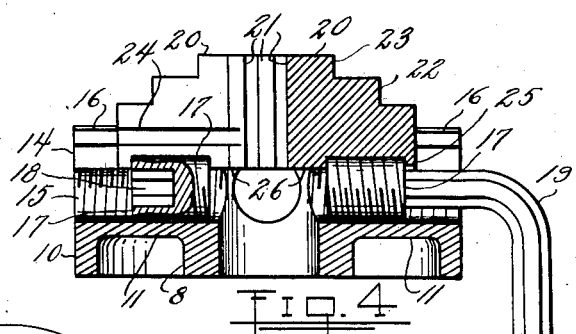
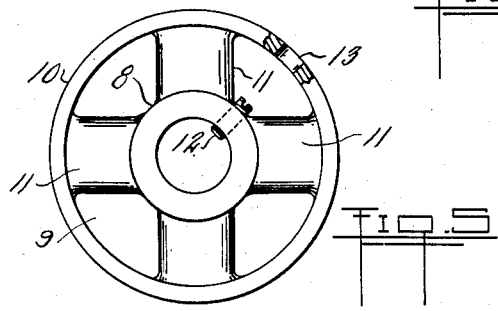
Robert L. Watson
Inventor
By
Attorney Patented Oct. 23, 1934

1,977,658

UNITED STATES PATENT OFFICE 1,977,658

CHUCK

Robert L. Watson, Toledo, Ohio, assignor to Clement W. Watson, Toledo, Ohio

Application April 17, 1933, Serial No. 666,476

1 Claim. (Cl. 279—112)

This invention relates to adjustable heads or holders for tools or articles of work.

This invention has utility when incorporated in machine tools, say of the lathe type, being especially adapted as an efficient practical item for use in connection with small power outfits such as in homes and in smaller shops.

Referring to the drawing:

Fig. 1 is a fragmentary side elevation of an embodiment of the invention in a lathe;

Fig. 2 is a view looking into the chuck or holder of the lathe of Fig. 1, the showing being on an enlarged scale;

Fig. 3 is a side elevation of the chuck of Fig. 2;

Fig. 4 is a section through the chuck of Fig. 2; and

Fig. 5 is a view with parts broken away, from the opposite side of the chuck in Fig. 2.

Belt 1 operable from a source of power may rotate pulley 2 on shaft 3 mounted in bearings 4, carried by lathe bed 5. There is also shown mounted on this bed 5 adjustable tail stock 6 and rest 7.

The chuck as herein disclosed is shown comprising a hub 8, disk 9 terminating in cylindrical portion 10. Opposite the disk 9 and within the cylindrical portion 10 there are radiating ribs 11 between the hub 8 and cylindrical portion or rim 10. Set screw 12, accessible through opening 13 in the rim 10, is adjustable for anchoring this member with the shaft 3. Accordingly the chuck device may be readily mounted or disconnected from a rotative member in its provision of a holder for a tool or for work.

The disk face 9 of this chuck is shown provided with outwardly extending ways having open sides 14 at the disk face 9 extending downward into internally threaded trough 15. The open side of the slot 14 of these ways is shown provided with a pair of opposing longitudinally extending ribs or ledges 16. Externally threaded runners 17 are located in the internally threaded portions 15 of the ways. These runners 17 have end seats 18 in which may be inserted wrench 19 as operating means for rotating the runners 17 separately in clockwise or counter clockwise directions. By rotating such clockwise the runner 17 travels radially inward along the trough 15. Counter clockwise rotation progresses these runners 17 radially outward.

Reversible jaws 20 are shown in one position in which engaging face 21 of one jaw may oppose similar face of its companion jaw and if such are operated toward each other there may be located a piece of work or a tool in a desired concentric or eccentric position as to the shaft 3. In reversal of the jaw 20, increase in radial capacity for gripping work may be had whether face 22 or 23 be used. Each of these jaws 20 is shown having pair of grooves 24 coacting as directing or guiding means with the ledges 16 for holding the jaws in position to project from the ways 14 in travel therealong. Additionally, each of these jaws 20 is provided with downward extension or overhanging means 25, 26, astride the runner 17. This means that the jaw 20 in its seats is frictionally held by the angle of friction of the threads between the runner 17 and the trough 15. Furthermore rotation of the runner 17 in the trough 15 directly adjusts the jaw 20 inward or outward along the face of disk 9.

The location of the ways 14, 15, is in the ribs 11. This means that the chuck member is a shell which may be produced by casting. The threading of the machine parts as well as the provision of the ways and ribs are such operations as may be simply and accurately produced as a quantity operation with degrees of economy in a reliable practical product.

What is claimed and it is desired to secure by United States Letters Patent is:

A chuck having a rim, a hub, and an intermediate web having on one side thereof ribs extending between the rim and hub, said web on the side thereof away from the ribs having in the region of the ribs radial ways open away from the ribs and of less width than the diameter of the ways, said ways being threaded for more than 180°, an externally threaded actuator in each way protruding into the radial opening, said actuator being rotatable, directly engaging the chuck and radially movable therein, said open sides of the ways being parallel and having opposing ribs, and a chuck jaw in each way guided by said ribs and having ledge portions engaging the actuator for effecting positive radial travel of the chuck jaw with the actuator relatively to the chuck web.

ROBERT L. WATSON.